United States Patent [19]

McNair et al.

[11] Patent Number: 5,490,370
[45] Date of Patent: Feb. 13, 1996

[54] BATTERY OPERATED ELECTRIC MACHINES

[75] Inventors: John D. McNair, Olinda; Aik P. Cheah, Clayton South, both of Australia

[73] Assignee: Black & Decker Inc., Newark, Del.

[21] Appl. No.: 108,470

[22] Filed: Aug. 18, 1993

[30] Foreign Application Priority Data

Aug. 18, 1992 [AU] Australia .................. PL4179

[51] Int. Cl.⁶ .................................. A01D 34/78
[52] U.S. Cl. .................. 56/11.9; 56/10.2 R; 56/DIG. 15
[58] Field of Search .................. 56/11.9, 10.8, 56/16.7, DIG. 15, 10.2 R, 10.5

[56] References Cited

U.S. PATENT DOCUMENTS

| | | | |
|---|---|---|---|
| 3,581,480 | 6/1971 | O'Connor, III et al. | 56/11.9 |
| 3,821,626 | 6/1974 | Maver et al. | 320/3 |
| 3,823,358 | 7/1974 | Rey | 320/3 |
| 3,841,069 | 10/1974 | Weck | 56/11.9 X |
| 4,201,463 | 5/1980 | Harigaya et al. | 354/86 |
| 4,333,302 | 6/1982 | Thomas et al. | 56/11.9 X |
| 4,558,281 | 12/1985 | Codd et al. | 324/433 |
| 4,835,453 | 5/1989 | Munning Schmidt et al. | 320/13 |
| 4,849,681 | 7/1989 | Munning Schmidt et al. | 320/13 |
| 4,882,896 | 11/1989 | Wilcox | 56/10.5 |
| 4,942,723 | 7/1990 | Wassell | 56/10.6 |
| 4,983,903 | 1/1991 | Bae et al. | 320/2 |
| 4,987,729 | 1/1991 | Paytas | 56/11.9 |
| 4,995,227 | 2/1991 | Foster | 56/249 |
| 5,022,587 | 6/1991 | Hochstein | 239/72 |
| 5,085,043 | 2/1992 | Hess et al. | 56/10.5 |
| 5,140,249 | 8/1992 | Linder et al. | 320/2 |
| 5,150,045 | 9/1992 | Nagano et al. | 320/62 |
| 5,159,272 | 10/1992 | Rao et al. | 324/429 |
| 5,301,494 | 4/1994 | Peot et al. | 56/10.5 |

FOREIGN PATENT DOCUMENTS

| | | |
|---|---|---|
| 7805591 | 12/1991 | Australia . |
| 0424577 | 5/1991 | European Pat. Off. . |
| 0466306 | 1/1992 | European Pat. Off. . |
| 0537081 | 4/1993 | European Pat. Off. . |
| 2636498 | 3/1990 | France . |
| 2652202 | 3/1991 | France . |
| 2032695 | 1/1972 | Germany ............... 56/11.9 |
| 3218148 | 11/1983 | Germany . |
| 3304708 | 8/1984 | Germany . |
| 3334128 | 4/1985 | Germany . |
| 221906 | 5/1985 | Germany . |
| 50-38189 | 4/1975 | Japan . |
| 4201752 | 7/1992 | Japan . |
| 2192102 | 12/1987 | United Kingdom . |
| 2226716 | 7/1990 | United Kingdom . |

*Primary Examiner*—Terry Lee Melius
*Attorney, Agent, or Firm*—Harness, Dickey & Pierce

[57] ABSTRACT

There is disclosed a lawn or grass mower having a cutting mechanism (14) driven by an electric motor (10), the electric motor (10) being powered by a rechargeable lead acid battery (11), the battery (11) being protected against damage caused as a result of over discharge by control means (13), said control means (13) being able to sequentially sample battery voltage discharge levels and to determine when the sampled battery voltage discharge level has dropped below a predetermined minimum level at which point disabling means (14) is activated to prevent the mower from being used again until the battery means (11) has been recharged through a complete recharging regime.

14 Claims, 7 Drawing Sheets

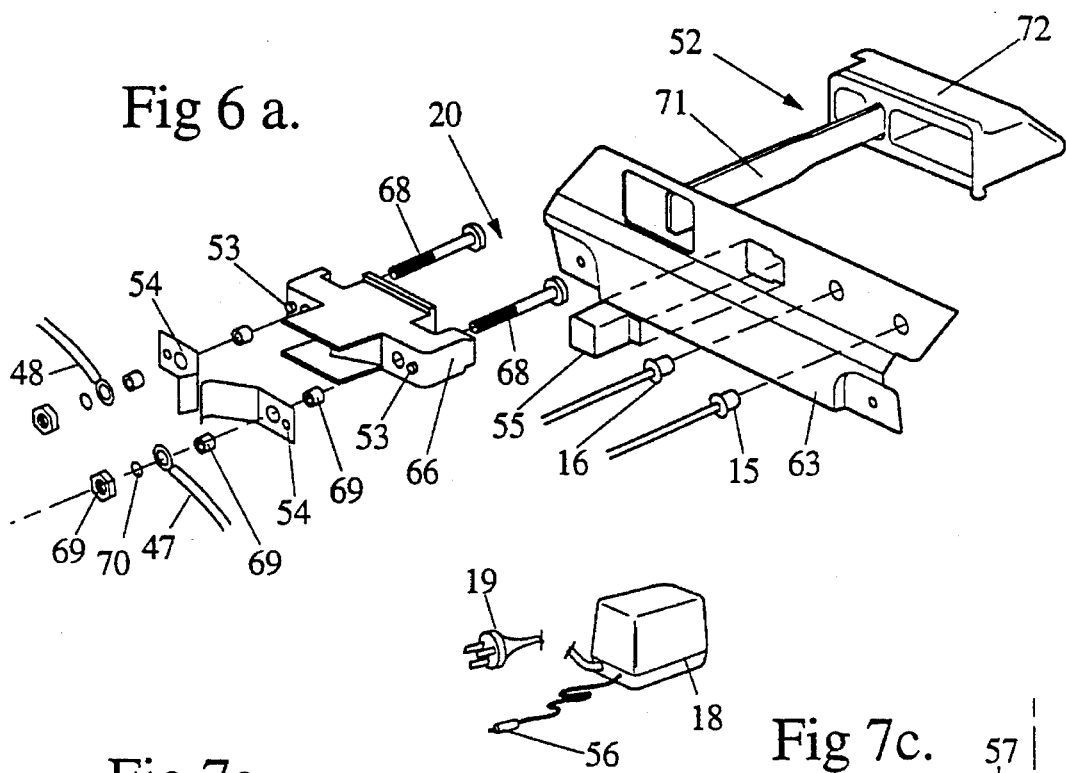
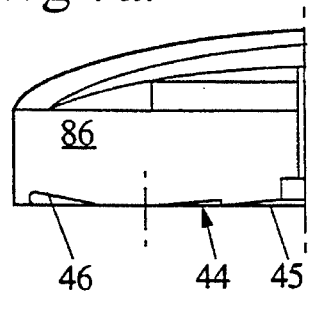
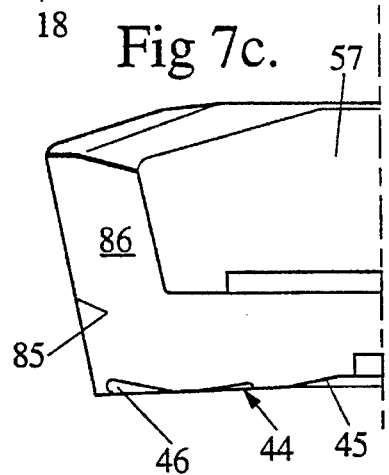
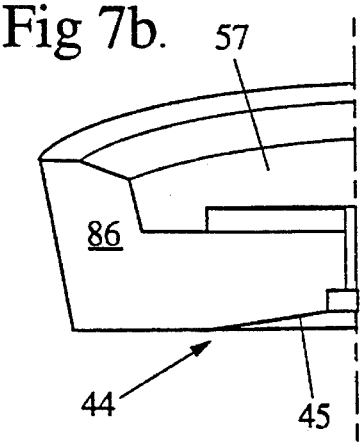
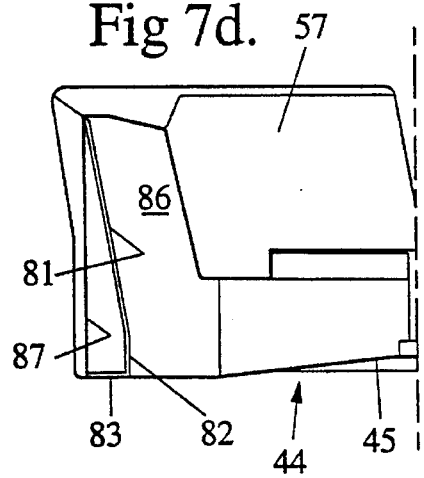

BATTERY OPERATED ELECTRIC MACHINES

The present invention relates to improvements in electric mowers powered by rechargeable batteries. Mowers of this general type are known in the prior art and examples of same may be found in Australian Patent Specification No. 78055/91 and U.S. Pat. Nos. 3,581,480, 4,987,729, 5,140,249, 4,882,896, 4,942,723 and 499,227.

It has been found that sealed lead acid batteries may be used as a suitable power source for lawn mowers or the like. Such batteries have the required performance characteristics to operate satisfactorily as a power source for an electric motor driving cutting blades of a lawn or grass cutting machine and they are capable of repeatedly being recharged. They do, however, have the disadvantages that if they are used to a stage where their discharge voltage drops below a certain limit then they cannot be recharged or the normal life expectancy of the battery is drastically reduced. When the term "battery" or "battery means" is used hereinafter it is intended to identify a battery or group of batteries that have this characteristic. The point at which this occurs does, however, depend to some extent on the rate of discharge of the battery which also depends on the conditions of use. In a lawn mower situation, it is conceivable that a user of the mower might wish to over extend the battery simply to finish a particular area prior to being forced to wait for the reasonably extended period necessary for recharging the battery, however, if this is done, the battery life will either be substantially shortened or immediately ended requiring the acquisition of a new battery for future operation of the mower. Clearly this is an undesirable circumstance which should be avoided if at all possible. In known prior art arrangements, over current sensing control devices have been used to disable the battery when current is drawn from the battery above a certain rate, however, these arrangements do not protect against battery failure (or life reduction) as a result of voltage discharge below the predetermined limits imposed by the battery manufacturer.

The objective therefore of the present invention is to provide control apparatus in the power supply system for battery powered machines, paricularly lawn or grass mowers, which will prevent the battery from being over used to a stage where the discharge capacity or life of the battery is substantially minimised (or ended).

Accordingly, the present invention provides control apparatus for a rechargeable battery means of a battery powered lawn or grass mower, said control apparatus including monitoring means to monitor during use of the lawn or grass mower voltage discharge levels of the battery means, and disabling means to disable said battery means from said mower upon said voltage discharge level dropping below a predetermined minimum level for the battery means, said disabling means preventing reuse of the mower until the battery means has been recharged. Preferably, the disabling means prevents reuse of the mower until the battery means has been recharged through a complete recharging regime.

Conveniently, the battery powered mower includes a motor adapted to drive mower cutting blades. Preferably, the monitoring means includes a micro processor controller adapted to repeatedly sample voltage discharge levels of the battery during functional use of the battery powered mower with said disabling means being immediately if the voltage level drop below said predetermined minimum level.

Under certain possible adverse (to the battery) conditions, it is also desirable to be able to automatically prevent use of the mower and thereby further discharge of the battery voltage levels. Typically, such situations arise where the cutting blades in the case of a mower are obstructed for some reason. This can occur by the blades engaging an immovable object such as a rock or by excessively heavy grass conditions. In such circumstances, because of high current loadings, the discharge voltage level drops rapidly but is also quickly recovered (if the obstruction exists only momentarily) to a level below but close to the level prior to the obstruction occurring. A similar characteristic occurs at start up under normal conditions. However, if the obstruction is more than transient, then the voltage recovery is very slow to recover (if at all) to levels well below the voltage level prior to the obstruction occurring. The present invention therefore also aims at providing a means for disabling the mower to prevent battery damage upon an obstruction to the work implement being recognised without affecting the operation of the machine under normal start up conditions.

Accordingly, the present invention also provides control apparatus for a rechargeable battery means of a battery powered lawn or grass mower, said control apparatus including monitoring means adapted to monitor voltage discharge levels of the battery means, means for establishing a predetermined reference voltage level and for recognising a rapid drop in voltage level at a rate higher than normal operational voltage level drop, and disabling means adapted to disable said battery means from said mower if the voltage discharge level of said battery means as monitored by said monitoring means does not return to a voltage level greater than a control level being a preset differential below said reference voltage level within a predetermined period of time. Conveniently, the aforesaid predetermined period of time is determined from commencement of said rapid drop in voltage level. In one preferred embodiment the predetermined reference voltage level may be the voltage level sensed first prior to said rapid drop in voltage level. In a second preferred embodiment, the reference voltage level may be the voltage level sensed at each point in time that operation of the mower commences. For example, the first reference voltage level would be the battery voltage level first sensed when the handle operating switch is first moved to an operational position. Thereafter, if the mower is stopped (for example to empty the grass catcher) then the reference voltage is the voltage level sensed when the handle operating switch is reactivated to restart the mower. Preferably the control apparatus is also arranged to disable said battery from the mower upon the monitored discharge voltage of the battery dropping below a preset minimum regardless of the circumstances.

In accordance with a further aspect of the present invention, a safety mechanism for an electrically powered mower adapted to prevent inadvertent operation of the motor of the mower is provided. In Australian Patent Application No. 78055/91, there is disclosed a similar safety system incorporating a key member adapted to be inserted to actuate a switch mechanism from a normal circuit open position (preventing mower operation) to a circuit closed position when inserted allowing mower operation. One disadvantage of this arrangement is that the key member is in fact only an external actuator requiring a switch mechanism within the mower housing which adds certain costs to the overall assembly. Furthermore, only partial removal of the key member could result in the switch mechanism being opened allowing the key member to remain in position for possible inadvertent reactivation in undesirable circumstances. The objective of this aspect of the present invention is to provide a disabling system of the aforementioned kind which will avoid the costs of this separate switch mechanism and which will also prevent inadvertent reactivation in undesirable circumstances. Accordingly, the present invention also provides a control means for a mower comprising an electric motor adapted to drive a cutter mechanism and electrical connection means between a power source and said motor, said control means including switch means being opened upon removing a switch operating member from said mower and being closed by operationally inserting said switch operating member into said mower, said control means being characterised by said switch operating member forming a part of the electrical connection means when operationally inserted to close said switch means. Conveniently, said operating member comprises an electrically conductive blade element adapted to be inserted between a pair of plate contact members whereby when the switch means is closed, electrical contact is established between the two plate contact members via said blade element. Thus, the operating member needs to be removed completely to open the switch means. Each of the plate contact members may be mounted for at least limited movement relative to said blade element to increase the degree of electrical contact between each contact member and the blade element. Where the source of power comprises a rechargeable battery, it is desirable to provide a recharging connection means adjacent the aforesaid switch means whereby in the closed position, an enlarged head portion of the operating member may cover both the switch means and the recharging connection means thereby protecting same and preventing inadvertent connection of the recharging means to an external source of power when the switch operating member is inserted.

In accordance with a still further aspect of the present invention there is provided a lawn or grass mower including an electric motor driving a cutting means and a rechargeable battery means for powering said electric motor, said mower further including recharging means adapted for connection to an external power source and when so connected, said recharging means is adapted to pass said battery through a defined recharging regime prior to allowing reuse of said mower. Advantageously said defined recharging regime comprises a first trickle charging stage from a nominally flat condition of said battery means until the battery means achieves a first predetermined voltage level, a second charging stage where the battery means is charged at close to or at a maximum charge rate possible for said battery means until a second predetermined over charge voltage level for the battery means is achieved, thereafter maintaining charging of said battery means for a predetermined period of time while ensuring battery voltage does not exceed an upper limit for said battery means greater than said second predetermined over charge voltage level.

The control systems described above have been developed primarily for use in an electrically powered mower. In relation to this mower development, it has been proposed to use principles disclosed in Australian Patent No. 610546 in the construction of the mower deck. In this prior art specification it is proposed generally to provide an increasing cavity volume adjacent the mower blades that increases both in height and radially outwardly as the blades approach the outlet chute to the mower catcher. Such arrangements provide an outwardly and upwardly inclined skirt over a significant proportion of the circumference of the deck which has been found to be operationally valuable but very difficult to make commercially with a one piece moulded or otherwise formed deck without the use of very expensive forming machinery. Thus, in accordance with a further aspect of the present invention, a mower deck is proposed comprising a one piece moulded or otherwise formed deck housing member having a mowing cavity with an inner facing wall extending upwardly and outwardly from a lower zone of the deck around at least a part of the periphery of the mowing cavity, and a false wall forming member adapted to be mounted in said cavity to extend the peripheral length of said part of the deck having said upwardly and outwardly inclined inner facing wall. Conveniently, the separate false wall forming member is located adjacent to an outlet opening from said deck adapted in use to lead to a mower catcher.

Preferred embodiments of the present invention are hereinafter described with reference to the accompanying drawings, in which:

FIGS. 6 and 6A are partly exploded perspective views of a mower incorporating aspects of the present invention; and FIGS. 7A to 7D are illustrative sectional views through the mower deck at positions A to D in FIG. 6.

Figure 1:
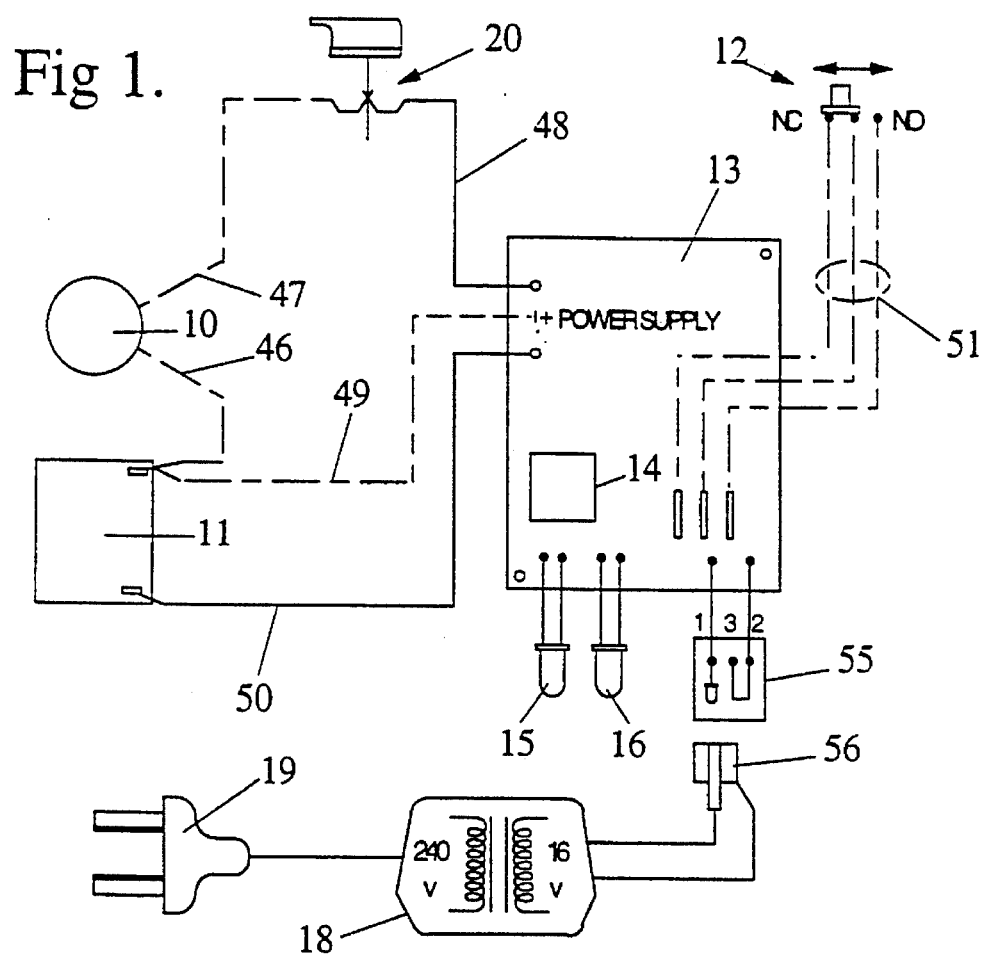
FIG. 1 is a typical wiring assembly diagram of a preferred embodiment of one aspect of the present invention.
Figure 2:
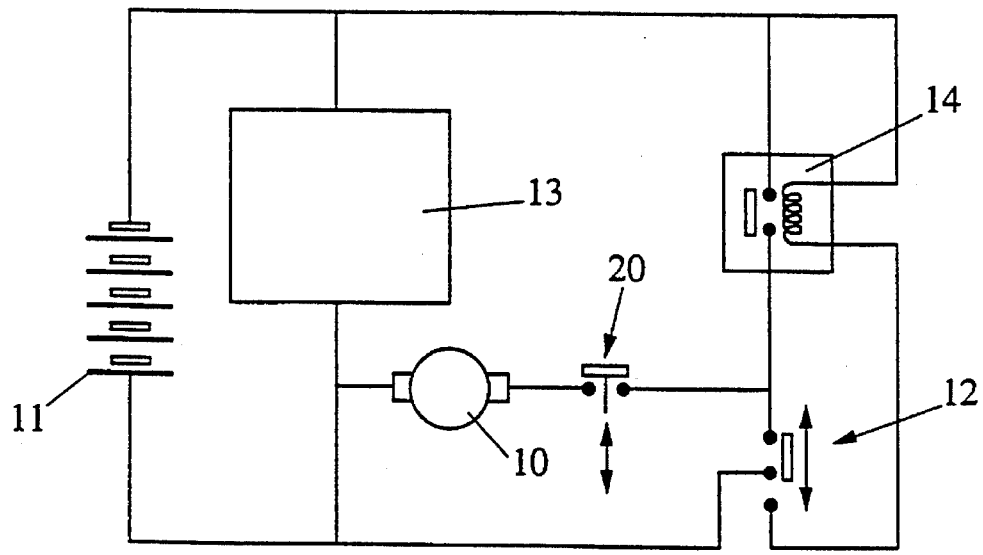
FIG. 2 is a typical circuit diagram of the apparatus shown in FIG. 1.
Figure 3A:
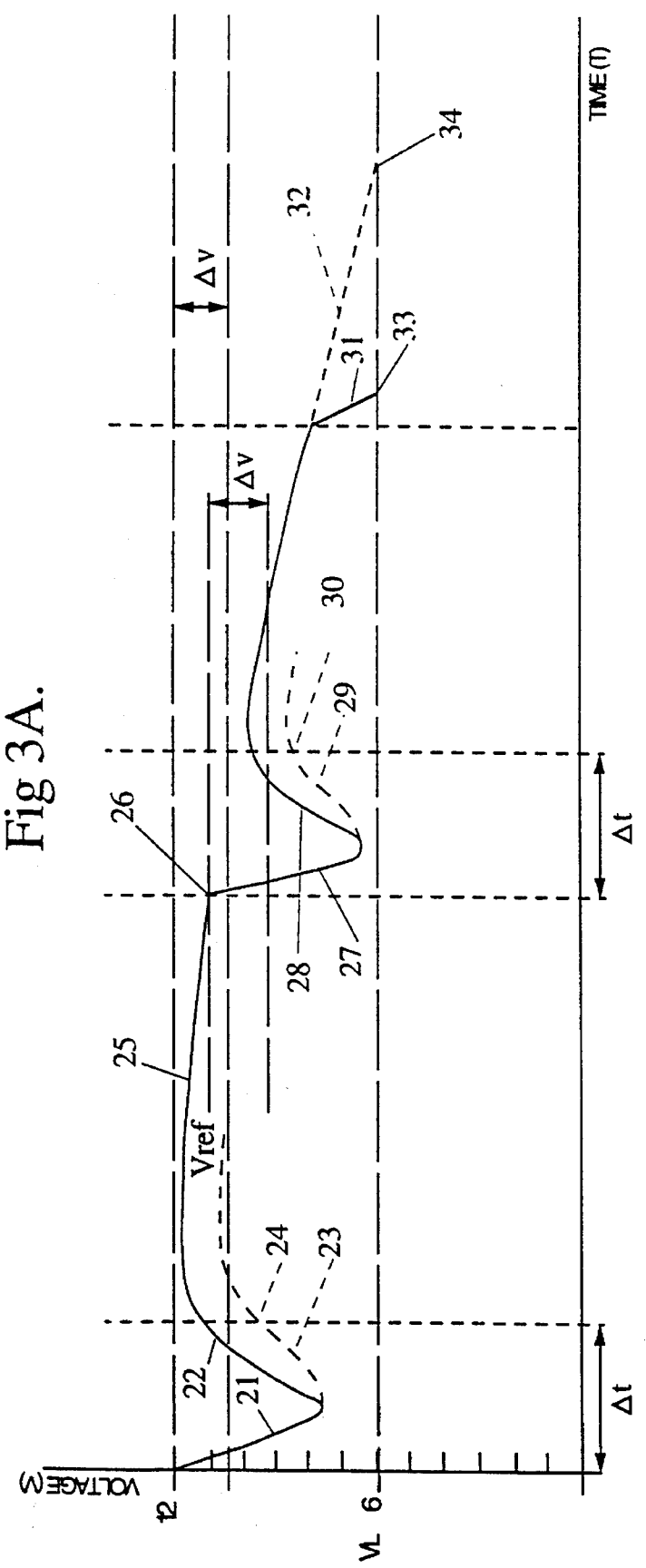
FIGS. 3A and 3B are illustrative graphical representations differing embodiments of typical normal and abnormal voltage discharge levels of the battery of FIGS. 1 and 2 used in a mower application.

Referring to FIGS. 1 and 2 of the drawing, a preferred embodiment of the present invention is depicted comprising a motor 10 adapted to operate mower cutting blades of any desired configuration (not illustrated). The motor 10 is powered by a rechargeable battery 11 such as a sealed lead acid battery nominally of 12 volts. A slider switch 12 is provided on the mower handle which must be activated by the mower user for power to be supplied from the battery 11 to the motor 10. If the operator removes his closing grip on the handle bar switch 12, then the switch automatically moves to an open condition preventing the battery 11 from supplying power to the motor 10. The circuit arrangement further includes a controller 13 in the form of a printed circuit board (PCB) and a motor disabling relay 14 controlled by the controller 13. The controller 13 senses loaded and unloaded battery terminal voltage and the status of the handle switch 12. The controller 13 further calculates rate of battery discharge during a discharge regime (i.e. during normal mower operation) and acts to operate the motor disabling relay 14 should the battery terminal voltage drop below a preset minimum voltage or should the control recognise a rapid drop in voltage (at a rate far greater than a normal use discharge rate) which is not recovered to a level greater than a preset differential $\Delta V$ (typically 1.6 vol differential) below a predetermined reference voltage within a predetermined time period $\Delta t$. This reference voltage may be the voltage level sensed at the time of operating the handle bar switch 12, or immediately prior to the abnormal rapid drop. FIG. 3A illustrates normal and abnormal voltage discharge situations during use of a mower wherein the reference voltage level set is the voltage level sensed immediately before the abnormal rapid voltage drop. For example, the voltage level at start up with a fully charged battery may be normally at 12 volts. At start up under normal circumstances there would be rapid drop in sensed voltage level (full line 21) followed by a rapid recovery (full line 22) to a level approximating the start up voltage level. If, however, something might be obstructing the mower blades (e.g. a rock or long grass) then the voltage recovery curve might follow the broken line 23 and at 24, i.e. after the expiry of the interval $\Delta t$; the battery would be immediately disabled, that is electrically disconnected from its load, the motor 10. If we assume, however, that no such problem arises during start up, then the battery would be discharged in normal use following a curve such as indicated by full line 25. Again, if the mower blades during use strike an obstruction then there will again be a rapid drop, for example from 26 following line 27 which could be recovered following line 28 if temporary or following broken line 29 if it is more than a mere transitory obstruction. Thus, during use, in such circumstances, if the voltage level is recovered to a voltage level greater than ΔV below the voltage level at the commencement of the rapid drop at 26 within a time period Δt, then normal use is continued. However, if the Δt, time period expires before this voltage level is recovered (e.g. broken line 29), then the battery is electrically disconnected from the motor at the expiry of the Δt period (point 30). As is also shown in FIG. 3A, if the battery discharge voltage drops below a predetermined minimum $V_L$ (nominally 6 volts in this Illustration), either due to an abnormal voltage drop (line 31) or simply as a result of normal battery discharge (line 32), then the battery is immediately disabled, i.e. electrically disconnected from the motor, for example at point 33 or 34. This electrical disconnection is in each case performed by the relay 14. The controller 13 is then arranged such that the relay 14 cannot be reactivated until after a defined battery recharging regime has been completed.

Figure 3B:
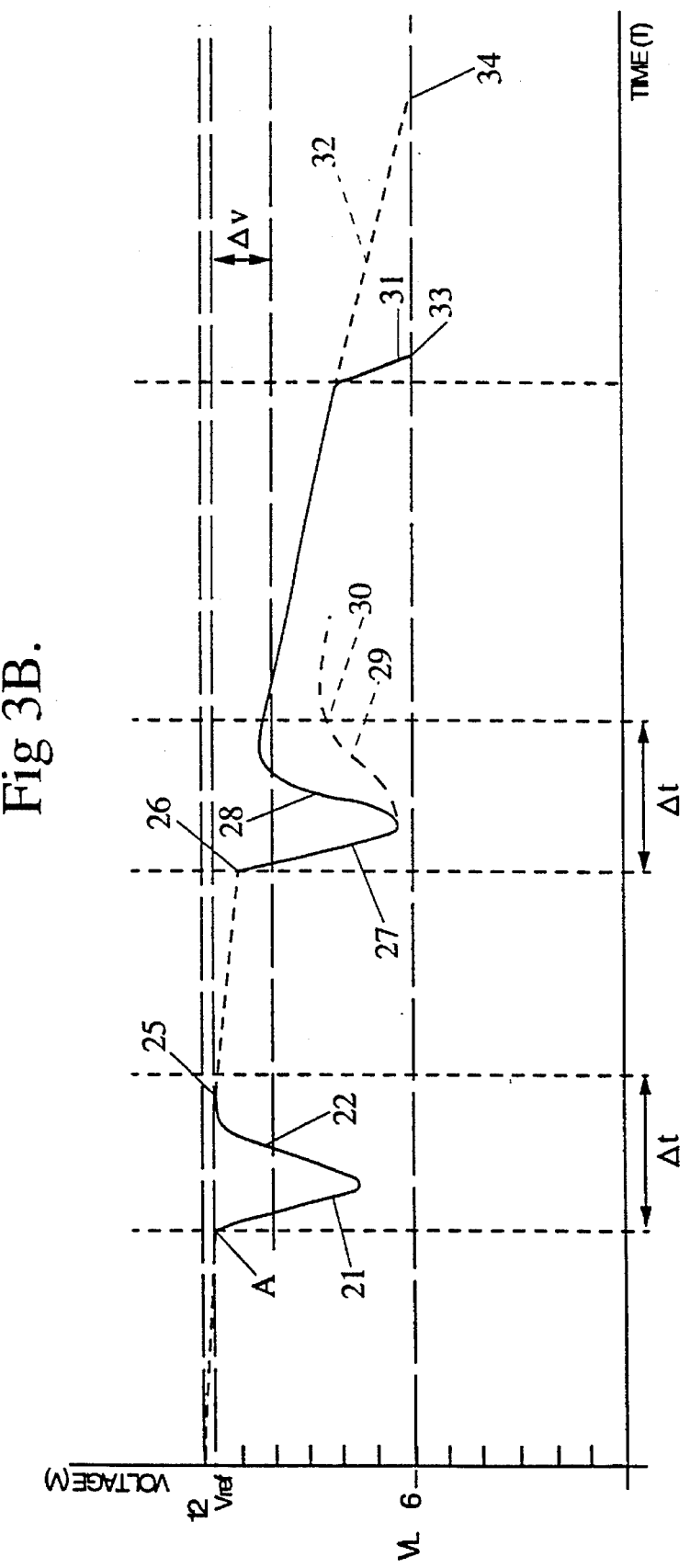

FIG. 3B illustrates a possible alternative to that of FIG. 3A. In this case the predetermined reference voltage is the voltage level sensed at each point the mower is restarted. For example, has been used for a period of time and then stopped (for any reason), the battery level will have dropped through this use of point A. If the mower is reactivated, the sensed voltage level at this point of reactivation becomes the reference voltage Vref until such time as the mower is stopped and again reactivated. If there is a sudden drop in voltage (as discussed above with reference to FIG. 3A) then so long as the voltage level is recovered to a level greater than ΔV below Vref, then normal operation continues. If this recovery does not occur within the period Δt then the battery is disabled immediately. Thus, the difference between FIGS. 3A and 3B is that in FIG. 3A, the reference voltage is always the sensed voltage level immediately before any abnormal voltage drop whereas in FIG. 3B, the reference voltage is the sensed voltage level at start up of the machine immediately before the rapid voltage drop.

The control system conveniently includes two visual displays comprising a power on LED 15 and charge required LED 16. The power on LED 15 is illuminated when the charger 17 is connected to power source (commonly a conventional 240 V alternating supply) via a suitable transformer 18 and plug 19. The charge required LED 16 commences to flash and a warning buzzer or beeper sounds when the relay 14 has been activated indicating recharging of the battery is required. When the power on LED 15 is activated indicating the battery has been connected to a power source via the charger 17, the charge required LED 16 remains continuously illuminated until the charging regime is completed. Should the battery not be connected to a power source as aforesaid when recharging is required, the aforesaid warning sound and light is continued for a predetermined period of time and is thereafter continued with a longer period between each illumination of the LED 16 and sounding of the warning buzzer, beeper or the like until the battery terminal voltage drops to a second preset level $V_x$ below $V_L$ where the battery charge is protected by discontinuing the warning light and sounds. Typically $V_x$ might be set at nominally one volt below $V_L$.

Figure 4:
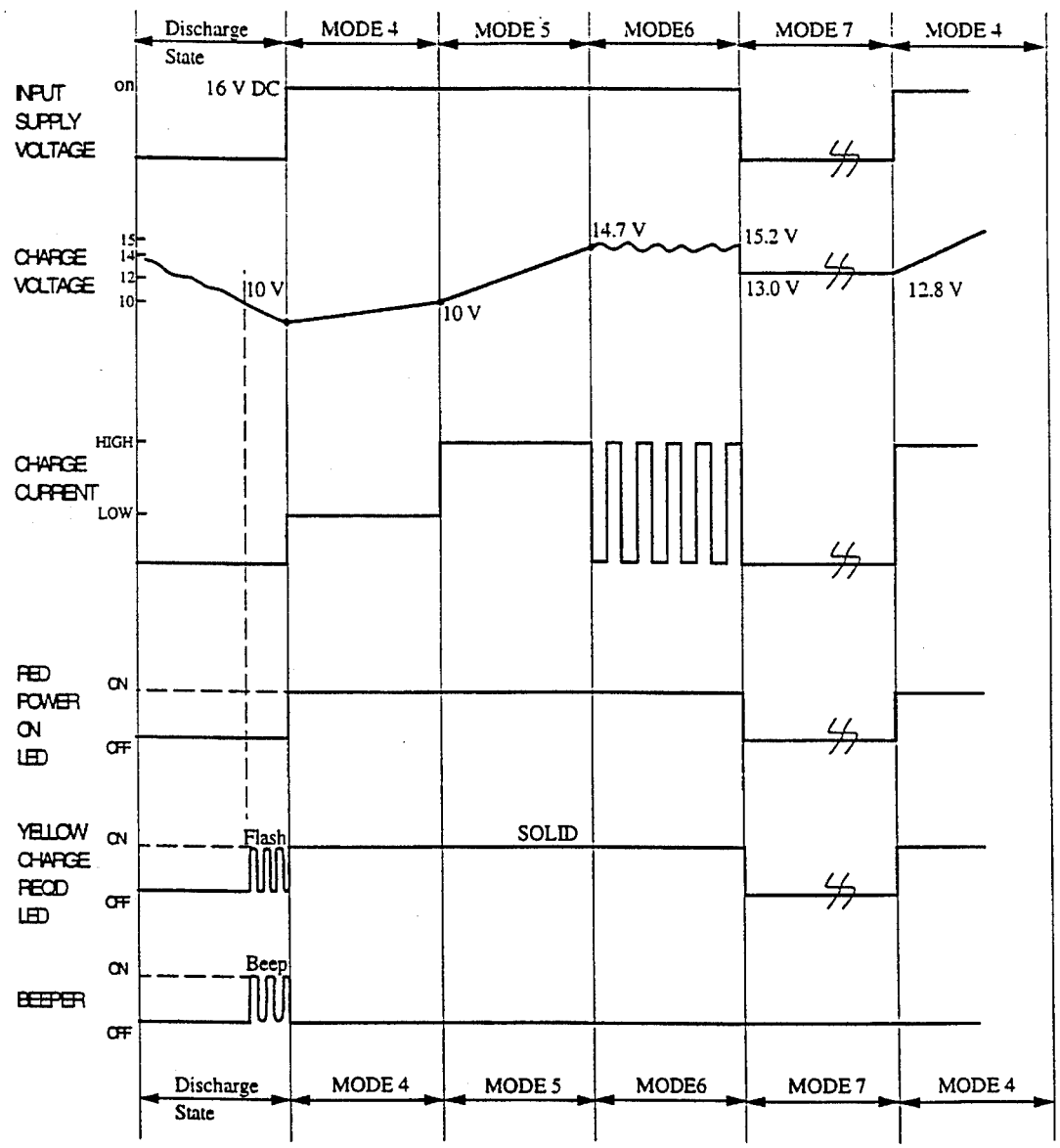
FIG. 4 is illustrative graphical representations for the various charging stages for a battery controlled by apparatus according to the present invention.

FIG. 4 of the accompanying drawings illustrate a typical preferred charge regime for the control apparatus of the present invention. If the battery is in a nominally flat condition, it cannot accept a high charge rate. Therefore it is trickle charged until voltage $V_T$ is reached. The circuit then switches to a bulk charge regime where the battery can be charged at close to or at the maximum charge rate possible. As the battery voltage builds up the $V_{23}$, the circuit changes to stage 3, the "overcharge" stage (point C on the charge voltage curve). When the battery reaches point D on the voltage curve, the charging current begins to taper off (charge current curve). Upon reaching point E, the battery voltage is equal to VOC (overcharge voltage) and the circuit switches abruptly to stage 4. At this point a timer (say three hours) is started and the current is modulated to sensure that the battery voltage does not exceed say 15.2 volts. This ensures that the battery receives sufficient overcharge to ensure 100% discharge capacity. At the end of the predetermined time, all current is stopped. The battery terminal voltage will drop quickly to say 13.2 volts, the "natural" voltage of the cell stack. From this point, the battery will 'self-discharge' at a very low rate until a predermtined voltages of say 12 volts. At this point the charger will re-initiate the charge regime. Of course, because the battery is only slightly discharged, the charger will cycle through the first stages quite quickly until the timer is again initiated. A full predetermined (say three hours) time will be imposed again. At stage 5, the charge required LED 16 is deactivated with the power on LED 15 still activated and the relay 14 is enabled to allow the motor to be reconnected to the battery for further use as may be required. A second option would be to charge until point E on the voltage curve and then leave the charger on at say 13.8 volts for continuous 'float' charging. In this mode, after a predetermined time in 'float', the "charge-required" LED 16 would be deactivated to signal that the unit is ready for use, and the relay 14 would be enabled to allow further use.

Figure 5:
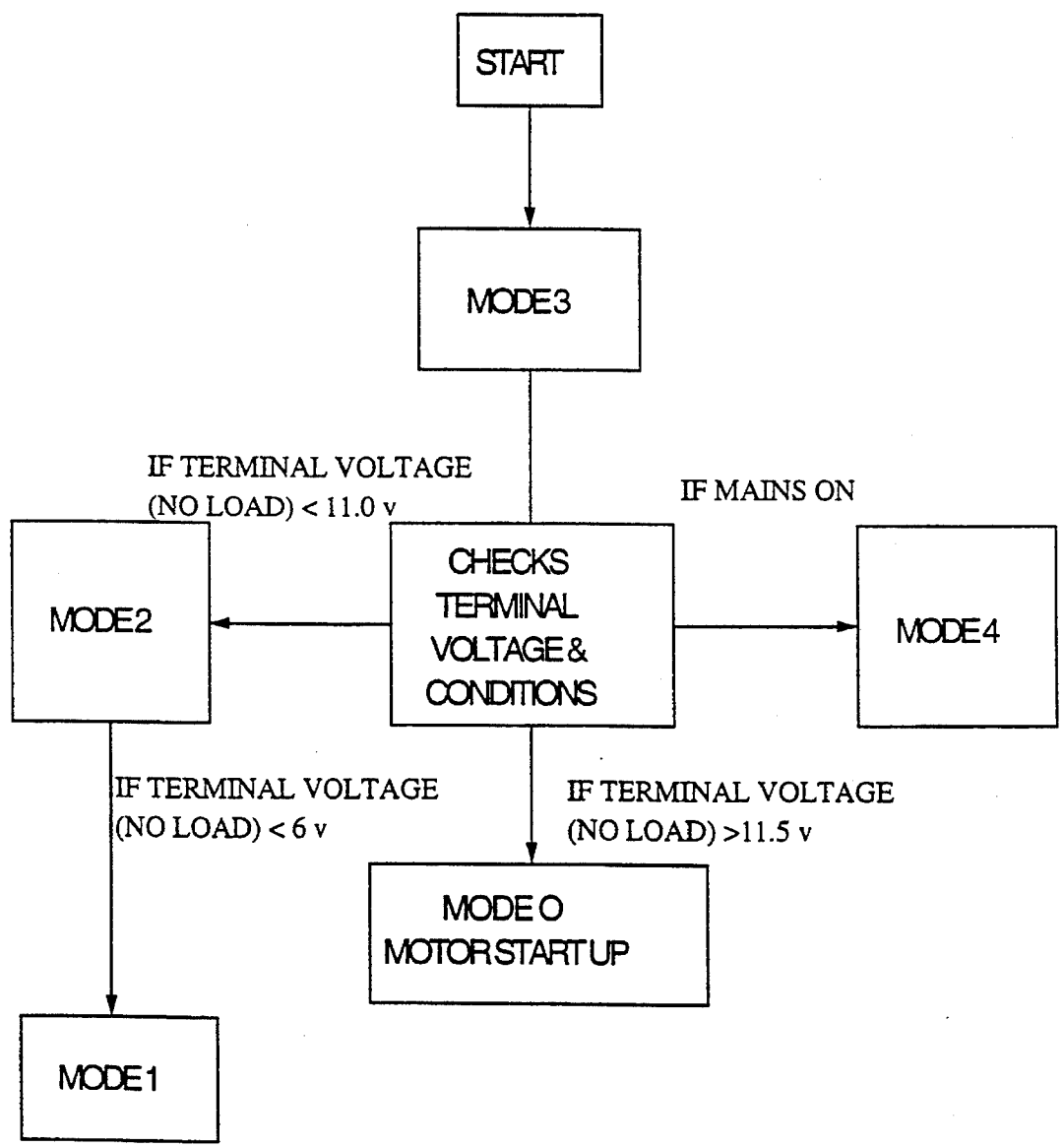
FIG. 5 is a block diagram illustrating the control functions of the apparatus according to the present invention.

FIG. 5 illustrates in block diagram form the control functions of the controller 13 during differing modes and conditions sensed by the control 5 system. The functions are further indicated by the following table:

5,490,370

| MODE | CONDITION DESCRIPTION | CONDITION DETECTION | LED INDICATOR POWER | LED INDICATOR CHARGE | BEEPER | MOTOR LOCKOUT | COMMENTS |
|---|---|---|---|---|---|---|---|
| 0 | MOTOR RUNNING<br>* IF VOLTS (ON LOAD) >11.5 V, MOTOR IS ON<br>* IF MAINS ON, MOTOR WILL SWITCH OFF<br>* IF HANDLE SWITCH RELEASED THEN MOTOR OFF<br>* IF VOLTS (ON LOAD) <6 V<br>* IF VOLTS (ON LOAD) <8 V FOR >10 SECS - MOTOR WILL SWITCH OFF<br>* IF VOLTAGE DROP (ON LOAD) >=1.6 V FOR >10 SECS, MOTOR WILL SWITCH OFF | <br><br>GO TO MODE 4<br>GO TO MODE 3<br>GO TO MODE 2<br><br>GO TO MODE 2<br><br>GO TO MODE 3 | OFF | OFF | OFF | OFF | IN MODE 0 VOLTAGE CHECK AT 1 PER SEC<br>MODE 1 TO MODE 3, VOLTAGE READING IGNORED FOR 1ST 4 SECS WHEN CHANGING FROM ANY MODE TO ANOTHER<br>INITIAL VOLTAGE REFERENCE TAKEN FROM END OF 3 BEEPS IN MODE 3 |
| 1 | LOW POWER<br>* IF VOLTS (NO LOAD) <6 V<br>* IF VOLTS (NO LOAD) <5 V<br><br>* IF MAINS PLUG ON<br>* IF HANDLE SWITCH ACTIVATED, BEEP x1 | <br><br><br><br>GO TO MODE 4 | OFF<br>OFF<br><br>OFF | OFF<br>OFF<br><br>OFF | OFF<br>OFF<br><br>BEEPS x1 | ON<br>OFF<br><br>ON | IN MODE 1, NO VOLTAGE CHECK.<br>ELECTRONICS OFF, WILL NOT ACCEPT CHARGE, SERVICE CALL REQUIRED.<br>IF VOLTAGE (NO LOAD) <5 V, WILL NOT BEEP |
| 2 | POWER UP<br>* IF CHARGE REQUIRED, BEEP & LED x2....<br>* IF VOLTS (NO LOAD) <6 V<br>* IF MAINS PLUG ON<br>* IF HANDLE SWITCH ACTIVATED, NO ACTION | <br><br>GO TO MODE 1<br>GO TO MODE 4 | OFF | FLASH x2 | BEEPS x2 | ON | IN MODE 2, VOLTAGE READING, BEEPER BEEPS AND LED FLASHES AT A RATE OF 4 TO 64 SECS DEPENDING ON BATTERY CONDITION, FOR EVERY 0.2 V DROP, BEEPING, FLASHING AND VOLTAGE CHECK INTERVAL INCREASES BY 4 SECS. |
| 3 | MOTOR START UP<br>* IF VOLTS (NO LOAD) <11.0 V<br>* IF MAINS PLUG ON<br>* IF HANDLE SWITCH ACTIVATED, 11.0 V < VOLTS NO LOAD <13.5 V BEEP x3, MOTOR WILL SWITCH ON<br>* IF MOTOR LOCKOUT IS ON | <br>GO TO MODE 2<br>GO TO MODE 4<br><br>GO TO MODE 8<br>GO TO MODE 2 | OFF | OFF | OFF | ON | IN MODE 3 VOLTAGE CHECK AT 1 PER MINUTE |
| 4 | FIXED LOW CURRENT CHARGE<br>* IF MAINS PLUG ON<br>* IF HANDLE SWITCH ACTIVATED, BEEP 1x...<br>* IF MAINS OFF<br>* IF VOLTS (NO LOAD) <11.7<br>* IF VOLTS (NO LOAD) >10 V | <br><br><br>GO TO MODE 3<br>GO TO MODE 5 | ON<br>ON<br><br>ON | ON(SOLID)<br>ON(SOLID)<br><br>ON(SOLID) | OFF<br>BEEPS 1x<br><br>OFF | *ON<br>*ON<br><br>ON | THIS WILL PREVENT OPPORTUNITY CHARGING IF BATTERY VOLTAGE IS LOW |
| 5 | MAXIMUM CHARGE RATE<br>* IF MAINS PLUG ON<br>* IF HANDLE SWITCH ACTIVATED, BEEP x1....<br>* IF MAINS OFF<br>* IF VOLTS (NO LOAD) >14.7 V START 3 HR TIMER | <br><br><br>GO TO MODE 3<br>GO TO MODE 6 | ON<br>ON | ON(SOLID)<br>ON(SOLID) | OFF<br>BEEPS x1 | *ON<br>*ON | IN MODE 4 TO MODE 7 VOLTAGE CHECK AT 1 PER SEC<br>CHARGE IS OFF DURING VOLT CHECK<br>* MOTOR LOCKOUT MAY NOT BE ON DEPENDING ON STATUS OF BATTERY |
| 6 | VARIABLE CHARGE RATE<br>* IF MAINS PLUG ON<br>* IF MAINS OFF<br>* IF HANDLE SWITCH ACTIVATED, BEEP 1x....<br>* IF VOLTS (NO LOAD) >15.2 V CHARGE OFF | <br><br>GO TO MODE 3 | ON<br>ON<br>ON | ON(SOLID)<br>ON(SOLID)<br>ON(SOLID) | OFF<br>BEEPS 1x<br>OFF | *ON<br>*ON<br>*ON | CHARGE IS CONTROLLED BY PHASE ANGLE CHANGE |

-continued

| MODE | CONDITION DESCRIPTION | CONDITION DETECTION | LED INDICATOR | | | MOTOR LOCKOUT | COMMENTS |
| --- | --- | --- | --- | --- | --- | --- | --- |
| | | | POWER | CHARGE | BEEPER | | |
| | * IF VOLTS (NO LOAD) <15.0 V CHARGE ON | | ON | ON(SOLID) | OFF | *ON | |
| | * IF 3 HR TIMER IS COMPLETED NO CHARGE | GO TO MODE 7 | | | | | |
| 7 | * IF MAINS PLUG ON | | ON | OFF | OFF | OFF | |
| | * IF HANDLE SWITCH ACTIVATED, BEEP 1x ... | | ON | OFF | BEEPS 1x | OFF | |
| | * IF MAINS OFF | GO TO MODE 3 | | | | | |
| | * IF VOLTS (NO LOAD) <12.8 V | GO TO MODE 4 | | | | | |

Figure 6:
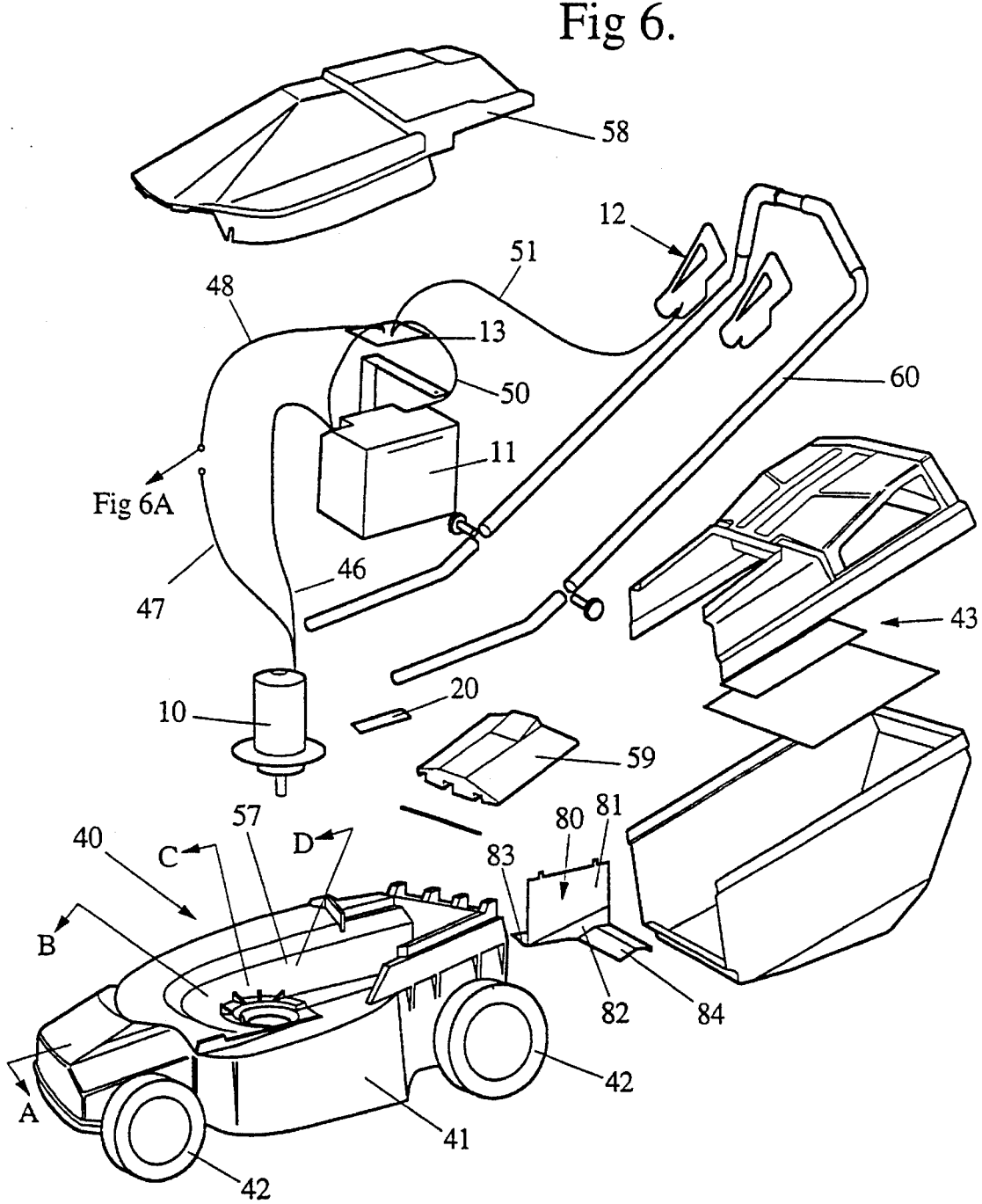

FIGS. 6 and 6A illustrate a physical construction of a mower 40 including aspects of the present invention. The mower itself comprises a mower deck 41 supported on wheels 42 with a suitable height adjustment mechanism (not shown). A catcher assembly 43 is provided adapted to receive cut grass from the mower deck 41. The mower deck and catcher are conveniently moulded from suitable plastics material to achieve a desired light weight and strength although other materials might also be useable. The cutter blade assembly 44 is relatively conventional and is not shown in FIGS. 6, 6A but can be seen in FIGS. 7A to 7D. The assembly comprises a disc 45 with two or more blades 46 pivotally mounted thereto. Other known forms of cutter assemblies could also be employed. The disc 45 is driven by an electric motor 10 which is electrically connected to the battery 11. Electrical connecting leads 46 to 51 are shown in FIGS. 1 and 6.

As can be seen in FIGS. 6 and 6A, the leads 47, 48 are interconnected by a safety switch 20 which comprises a pair of plate contacts 62 which are permitted to have limited pivotal movement about pivot points 53 by providing slightly oversized holes 54 through which fasteners 68 pass. An actuating key 52 is provided having a flat electrically conductive blade 71 and an electrically insulating handle 72. By insertion of the blade 71 through the receiving slot in the insulating housing 66, the blade 71 is then forced between the two contact plates 62 to establish an electrical path there between. The pivot arrangement of the contact plates 62 enables full edge contact between these plates and the blade 71 rather than a point contact that might result in the case of minor misalignment of the parts during assembly, thereby improving the electrical connection between leads 47 and 48. The safety switch 20 is provided to ensure that the battery is totally disabled or isolated when the mower is not in use. For the mower to be used, the key 52 has to be first inserted to make the primary connection between the leads 47, 48.

The socket 55 for receiving the charging contact 56 of the transferrer 18 is also provided adjacent to the safety switch 20. The handle 72 of the key 52 is advantageously enlarged so that when it is operationally inserted, it covers the charging socket 55 so that the socket is protected against ingress of dust, dirt or the like during use and also prevents the socket 55 from being inadvertently connected to an external power source while the mower is actually in a use mode.

As is shown in FIG. 6, the motor 10 and the battery 11 are generally mounted within the upper cavity 57 in the deck 41. These are covered by cover members 58, 59 and a handle 60 is provided to which switch 12 is mounted.

The deck 41 is constructed with an internal cavity design based on principles disclosed in Australian Patent No. 610546, that is, it is desirable that as the blades 45 approach the outlet chute into the catcher 43, there should be increasingly upward and outward space into which the cut grass can be thrown. This is generally illustrated in FIGS. 7A to 7C. This not only improves mowing efficiency but assists in depositing the cut grass in the rear of the catcher 43 (rather than causing an obstruction in the front of the catcher). This arrangement has been found to work well but to produce a one piece moulded or formed deck with this negative outer skirt angle, over a sufficient circumferential length, has proved to be very difficult without the use of very expensive forming machinery. This difficulty has been solved by one aspect of the present invention wherein a separate false wall forming member 80 is provided adjacent the outlet chute to the catcher 43.

This member 80 may conveniently be formed from metal sheet material and includes an inclined wall part 81 which is adapted to maintain the inclination of the outer skirt wall (for example as shown at 85 in FIG. 7C) of the moulded deck cavity 86. The member 80 may also include a lower vertical section 82 and floor section 83 adapted to engage against the bottom edge zone of the deck skirt 87. As will be seen, in the cavity of the member 80, there is either no outward inclination of the skirt 87 or the angle might be slightly in the reverse direction to facilitate formation of the deck. The member 80 may also include a bridging transverse floor part 84 to overlie the connection between the catcher 43 and the deck 41. Modifications of the aspects of the present invention disclosed herin are also anticipated by this description within the general scope of this disclosure.

The claims defining the invention are claimed as follows:

1. A control apparatus for a rechargeable battery means of a battery powered lawn or grass mower, said control apparatus including monitoring means to monitor during use of the lawn or grass mower voltage discharge levels of the battery means, and disabling means operative in a first position to permit energization of the mower by said battery means and in a second position to inhibit the energization of the mower by said battery means, said disabling means being responsive to said monitoring means to cause said disabling means to switch to said second position to disable said battery means from said mower upon said voltage discharge level dropping below a predetermined minimum level for the battery means, said disabling means remaining in said second position to prevent reuse of the mower until the battery means has been recharged through a complete recharging regime.

2. A control apparatus according to claim 1 wherein said battery means comprises a single sealed lead acid battery.

3. A control apparatus according to claim 1 wherein the monitoring means includes a micro processor controller arranged to repeatedly sample voltage discharge levels of the battery means during functional use of the mower, said disabling means being activated immediately upon the sampled voltage discharge level dropping below said predetermined minimum level.

4. A control apparatus according to claim 1 further including means for establishing a predetermined reference voltage level (V ref) and for recognizing a rapid drop in discharge voltage level of the battery means at a rate higher than normal operational voltage level drop, said disabling means being arranged to disable said battery means from said mower if the voltage discharge level of said battery means as monitored by said monitoring means does not return to a voltage level greater than a control level being a present differential (ΔV) below said reference voltage level (V ref) within a predetermined period of time (ΔT).

5. A control apparatus according to claim 4, wherein the predetermined period of time (ΔT) commences at the time of said rapid drop in voltage level.

6. A control apparatus according to claim 4 wherein the predetermined reference voltage (V ref) is the voltage level sampled immediately prior to said rapid drop in voltage level.

7. A control apparatus according to claim 4 wherein the predetermined reference voltage (V ref) is the voltage level sampled at each point in time that operation of the mower is commenced.

8. A control apparatus according to claim 1 further including switch means adapted to be opened to prevent operation of the mower and to be closed to permit operation of the mower, said switch means including an independent switch operating member capable of being removed from said switch means to enable opening of said switch means.

9. A control apparatus according to claim 8 wherein when said switch operating member is inserted into said switch means, said switch operating member forms part of electrical connection means from the battery means to a motor of said mower to thereby close said switch means.

10. A control apparatus for a rechargeable battery means of a battery powered mower, said control apparatus including monitoring means adapted to monitor voltage discharge levels of the battery means, means for establishing a predetermined reference voltage level (V ref) and for recognising a rapid drop in voltage level at a rate higher than normal operational voltage level drop, and disabling means adapted to disable said battery means from said mower if the voltage discharge level of said battery means as monitored by said monitoring means does not return to a voltage level greater than a control level being a preset differential (ΔV) below said reference voltage level (V ref) within a predetermined period of time (ΔT).

11. A lawn or grass mower including an electric motor driving a cutting means and a rechargeable battery means for powering said electric motor, said mower further including control means for controlling operation of said motor by said battery means, said control means including monitoring means to monitor, during use of the mower, voltage discharge levels of the battery means, and disabling means to disable said battery means from said mower upon said voltage discharge level dropping below a predetermined level for the battery means, said disabling means preventing reuse of said mower until the battery means has been recharged to a predetermined level by completing a defined complete recharging regime, said control means further including recharging means adapted for connection to an external power source and when so connected, said recharging means being adapted to pass said battery means through said defined recharging regime.

12. A lawn or grass mower according to claim 11 wherein said recharging means is carried by said mower.

13. A lawn or grass mower according to claim 11 wherein said defined recharging regime comprises a first trickle charging stage from a nominally flat condition of said battery means until the battery means achieves a first predetermined voltage level (VT), a second charging stage where the battery means is charged at close to or at a maximum charge rate possible for said battery means until a second predetermined over charge voltage level (Voc) for the battery means is achieved, thereafter maintaining charging of said battery means for a predetermined period of time while ensuring battery voltage does not exceed an upper limit for said battery means greater than said second predetermined over charge voltage level (Voc).

14. A lawn or grass mower according to claim 13 wherein said defined recharging regime is terminated upon completion of said predetermined period of time and is automatically recommenced while the recharging means remains connected to the source of electric power upon voltage levels dropping to a predetermined differential level below said second predetermined over charge voltage level (Voc).

* * * * *

UNITED STATES PATENT AND TRADEMARK OFFICE
CERTIFICATE OF CORRECTION

PATENT NO. : 5,490,370
DATED : February 13, 1996
INVENTOR(S) : John D. McNair et al.

It is certified that error appears in the above-indentified patent and that said Letters Patent is hereby corrected as shown below:

Column 12, line 51, claim 4, "present" should be --preset--.

Column 14, lines 1 - 2, claim 11, after "defined", delete "complete".

Signed and Sealed this

Twenty-fifth Day of June, 1996

Attest:

BRUCE LEHMAN

Attesting Officer     Commissioner of Patents and Trademarks